Feb. 2, 1926.

H. A. TURNIER

SPEED RECORDING DEVICE

Filed May 22, 1922

INVENTOR

Harry A Turnier.

Feb. 2, 1926.

H. A. TURNIER 1,571,820

SPEED RECORDING DEVICE

Filed May 22, 1922   2 Sheets-Sheet 2

INVENTOR

Harry A. Turnier.

Patented Feb. 2, 1926.

1,571,820

UNITED STATES PATENT OFFICE.

HARRY A. TURNIER, OF NEW YORK, N. Y.

SPEED-RECORDING DEVICE.

Application filed May 22, 1922. Serial No. 562,667.

*To all whom it may concern:*

Be it known that I, HARRY A. TURNIER, a citizen of the United States, residing at New York, in the county of New York and State of New York, have invented certain new and useful Improvements in Speed-Recording Devices, of which the following is a specification.

This invention relates to speed recording devices especially adapted for use on automobiles and other vehicles.

Briefly stated, an important object is to provide a speed recording device having means whereby to record the various speeds of a vehicle on a strip of paper and the strip of paper when rolled upon a spool may be conveniently removed and turned over to those in charge of the enforcement of the speed laws so that an inspection may be made.

Also, an object is to provide novel means to indicate the approximate date on which an excessive speed was obtained by the vehicle equipped with the speed recorder.

A further object is to provide a speed recorder which is neat in appearance, cheap to manufacture and of highly simplified construction.

Other objects and advantages will be apparent during the course of the following description.

In the accompanying drawing forming a part of this application and in which like numerals are employed to designate like parts throughout the same, Figure 1 is a vertical sectional view through the recorder.

Figure 1:
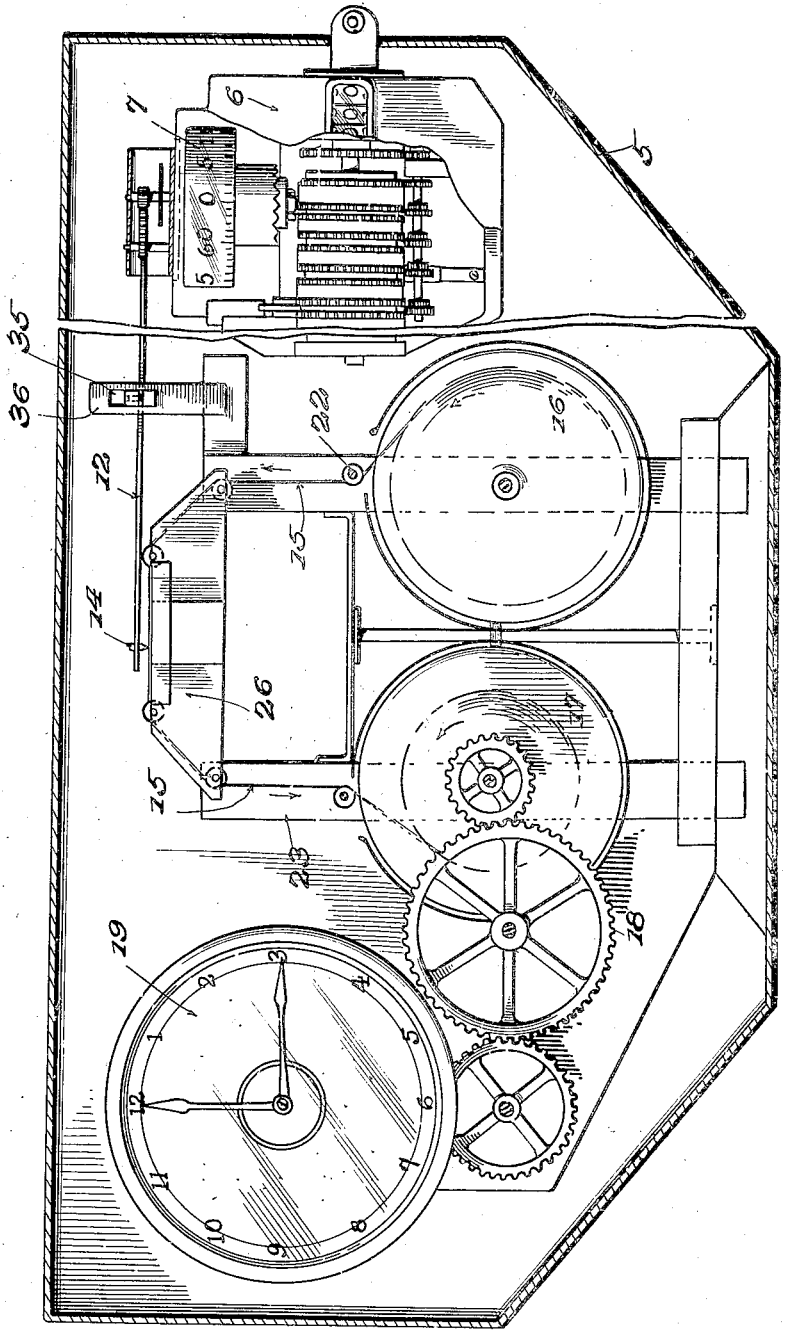
Figure 2:
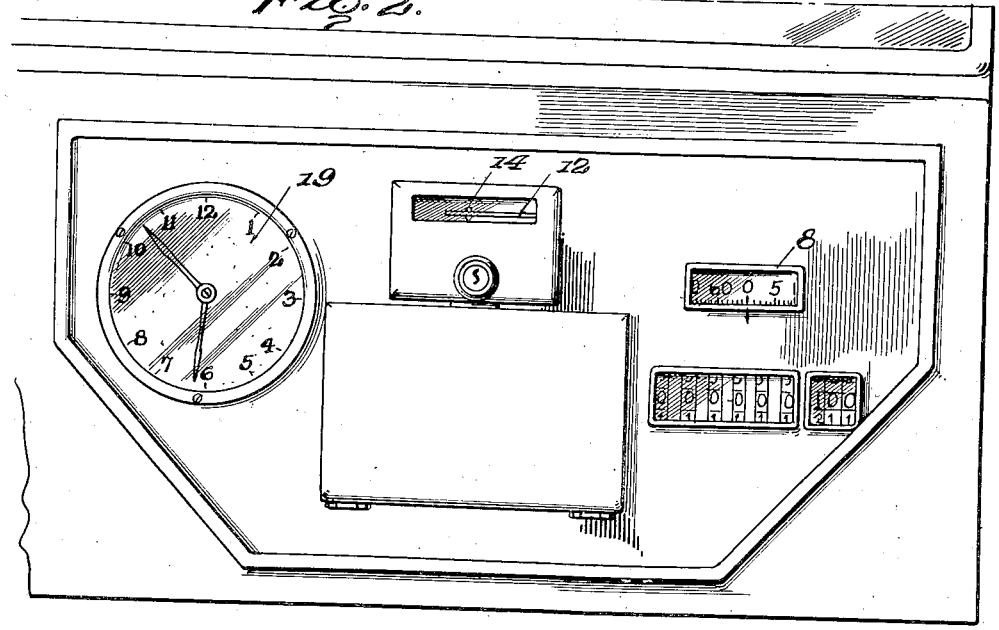
Figure 2 is an elevation of the same.

In the drawing the numeral 5 designates a casing within which a speedometer 6 is arranged, and the speedometer may be any desired or well known construction. As illustrated in Figure 1, the speedometer is provided with a turntable 7 having its periphery provided with numbers which may be seen through the sight opening 8 in the casing, all of which is old and well known. The operating mechanism for the speedometer causes the turntable to rock or oscillate as the speed of the vehicle changes so that the proper number will be seen through the sight opening. At this point it might be stated that the speedometer and the operating means therefor are sealed so that tampering with the same is positively prevented.

The improved speed recorder consists of a small gear 9 keyed or otherwise secured upon the shaft 10 of the turntable and meshing with a gear segment 11 carried at one end of a writing arm 12. The writing arm 12 is pivoted as indicated at 13 and one end of the same is provided with a writing element 14 which plays over a tape 15. It will be seen that as the speed of the vehicle fluctuates, the writing element 14 will be caused to move across the tape and thereby register the various speeds of the vehicle. It is understood of course that a suitable feeding means is provided for presenting new tape to the writing element.

Figure 3:
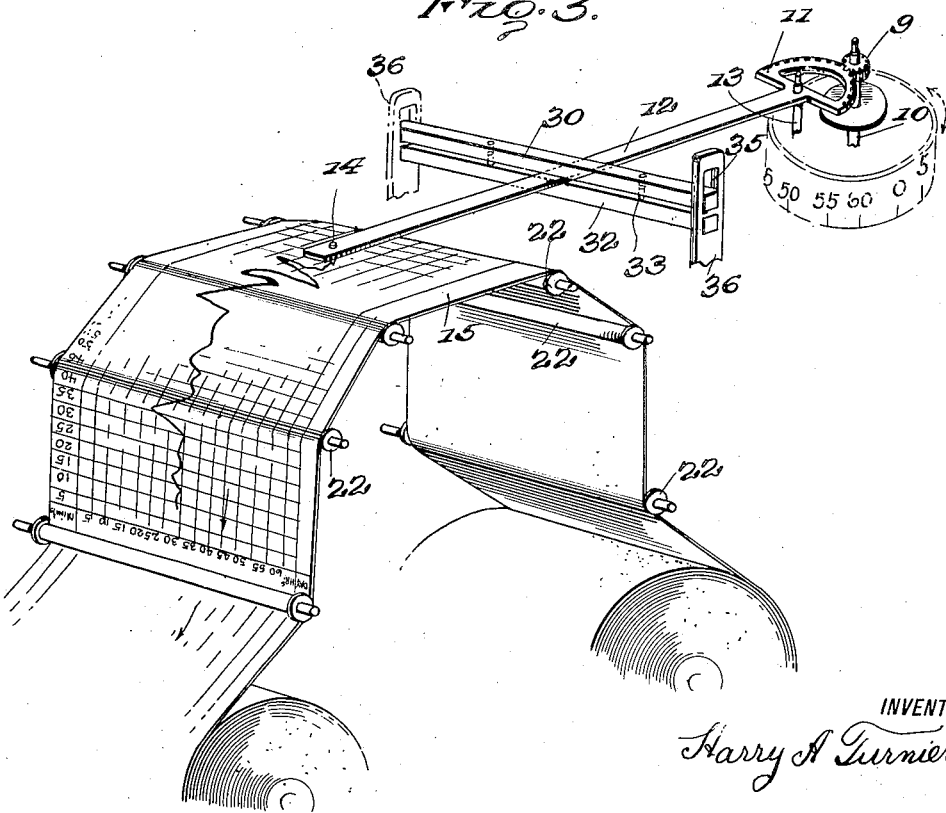
Figure 3 is a perspective illustrating the means for recording the various speeds on the tape.

Figure 3 illustrates that the tape is provided with a series of longitudinal columns or divisions and by reference to these divisions and the line formed by the writing element 14 the maximum speed may be readily ascertained.

Also, the tape is provided with a series of transverse partitions or divisions which indicate with reasonable accuracy the date on which the speed limit was exceeded if any such violation occurred.

As illustrated in Figure 1, the tape 15 is connected at its ends to spools 16 and 17, the spool 17 having connection with a train of gears 18 which are operated by a clock 19, the clock and the train of gears being located within the casing 5 and protected thereby. Also, in carrying out the invention the tape is guided by a plurality of guide rollers 22 supported by standards 23. The standards 23 of which there are two are provided with a cross head 26 which extends directly beneath the writing element 14 and acts as a bracing means for the tape being written on.

Attention is directed to Figure 3, wherein the indicating or writing arm 12 is shown as passing between and being guided by upper and lower horizontal guide strips 30 and 32 respectively, both of which may be provided with stop pins or lugs 33. The strips 30 and 32 act as a stabilizing means for the arm 12 and thereby offset the vibration of the vehicle to a great extent. The upper guide strip 30 may pass through vertical slots 35 in the standards or supporting rods 36.

In operation, the clock is wound so as to feed the tape beneath the writing element at a predetermined speed and the speedometer will operate the indicating or writing arm 12 for positively recording the various speeds obtained. As the tape 15 travels at a predetermined speed the date on which a certain speed is made may be readily ascertained.

At the end of a predetermined interval the tape may be removed and turned over for inspection to the authorities who may readily see if the speed laws have been observed.

I claim:—

In a speed recording device a frame having spaced lugs mounted thereon, a lower strip fixed to the lugs and bridging the space between them, the lugs being provided above the fixed strip with vertically disposed slots, a strip movably mounted in the slots and bridging the space between the lugs, spaced pins carried by the last mentioned strip and located at points spaced from the ends thereof and bearing at their lower end upon the upper surface of the fixed strip and a pivoted arm having an intermediate portion lying between the strips and located between the said pins.

In testimony whereof, I have affixed my signature.

HARRY A. TURNIER.